Aug. 16, 1932.   M. A. ANDERSEN   1,872,551

COUPLER

Filed Feb. 4, 1931

Inventor,
Martin A. Andersen,
By Minturn & Minturn,
Attorneys.

Patented Aug. 16, 1932

1,872,551

UNITED STATES PATENT OFFICE

MARTIN A. ANDERSEN, OF INDIANAPOLIS, INDIANA

COUPLER

Application filed February 4, 1931. Serial No. 513,248.

This invention relates to the art of couplers for use in interconnecting one vehicle to another and finds an application in toy trains as well as in full size vehicles such as truck trailers and the like.

A primary object of my invention is to provide a simple mechanism which may be of exactly the same structure whether applied to the front or rear end of a vehicle whereby two vehicles may be coupled one to the other by simply pushing the couplers together.

Another primary object of my invention is to provide a coupling means which requires no pins and which has a double connecting feature for the purpose of safety.

A further important object of the invention is to provide coupling means having a high factor of safety without having to employ any large mass of metal, my invention permitting the employment of pressed metal parts.

Figure 1:
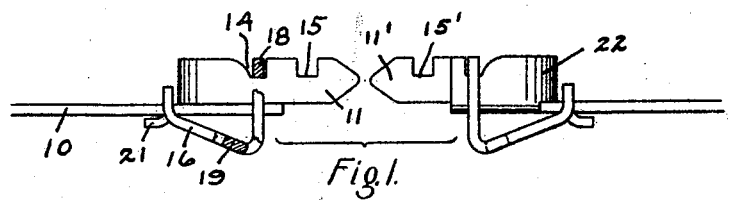
Figure 2:
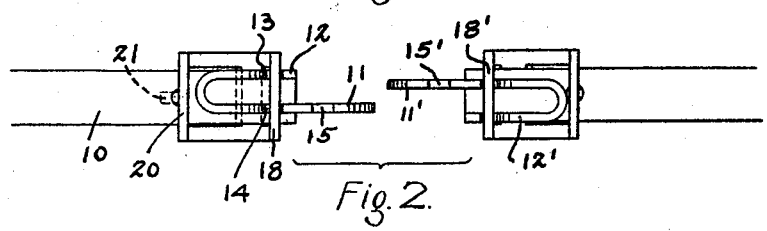
Figure 3:
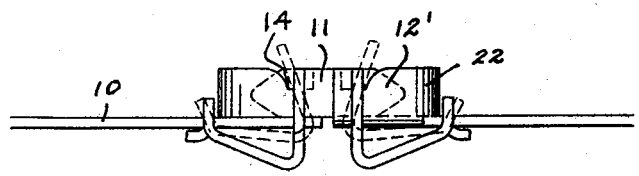
Figure 4:
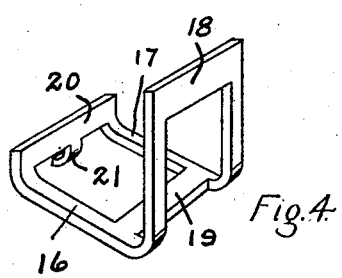
Figure 5:
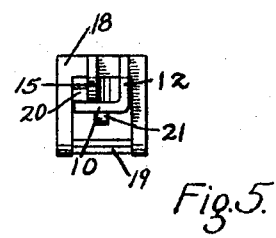

These and other objects will become apparent in the following description of the invention as illustrated in the accompanying drawing, in which Fig. 1 is a fragmentary side elevation of two opposing coupling members before being connected;

Fig. 2, a top plan view of these members;
Fig. 3, a side elevation of the two members interconnected;

Fig. 4, a view in perspective of the latch member;

Fig. 5, an end elevation of a coupling member; and

Figure 6:
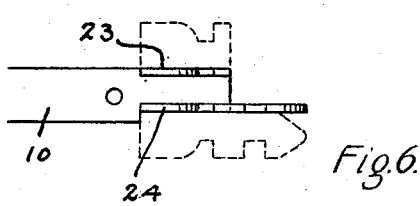

Fig. 6 is a top plan view of a modified form of the coupling member.

Like characters of reference indicate like parts throughout the several views in the drawing.

I form a coupling member to have a draw bar 10 and have one edge turned vertically upwards and bent around forwardly in a U-shape to have a tongue 11 projecting beyond the draw bar 10 and in spaced apart parallel relation to the upturned member 12, the tongue 11 being extended forwardly from over the draw bar 10. Both the side member 12 and tongue 11 are provided with opposing notches 13 and 14 respectively cut from their upper edges. The tongue 11 has a second notch 15 cut from its upper edge spaced beyond the notch 14.

I form a latch member, Fig. 4, having the side bars 16 and 17, the forward ends of which are turned upwardly and rearwardly slightly and are interconnected at their uppermost ends by the cross link 18. A tie bar 19 interconnects the side bars just back of the bends. The rear ends of the side bars 16 and 17 are turned upwardly slightly and are united by the cross bar 20, in the center of which from the under side extends a tongue 21. I slip this latching member over the draw bar 10 to have the cross bars 18 and 20 above and the bar 19 below and drop the tongue 21 down through a hole in the draw bar and bend this tongue rearwardly slightly to secure the latching member in place pivotally so that the forward end may be rocked upwardly to the limit position as fixed by the tie bar 19 striking the under side of the draw bar. Normally the tie bar 18 drops across the tongue 11 and side member 12 to rest in the notches 14 and 13.

I form a second coupling member generally designated by the numeral 22 which is an exact duplicate of the structure above described. When a coupling is to be made between the two members, they are brought toward each other as illustrated in Figs. 1 and 2 to have the tongues 11 and 11' approach each other in substantially parallel lines. The couplers are continued one toward the other to have the tongue 11 pass between the tongue 11' and the side member 12' to strike the cross bar 18', rock it upwardly and have it drop into the notch 15. At the same time the tongue 11' has raised the bar 18, passed thereunder and received the bar in a notch 15'. The two couplers are then in the position as indicated in Fig. 3 and are securely interconnected one with the other not only by one cross bar but by the two bars 18 and 18'. To uncouple the members, both of the attaching latches are raised upwardly as indicated by the dash lines in Fig. 3 whereupon the couplers may be pulled apart one from the other.

The form as shown in Fig. 6 permits the side member 23 to be turned upwardly directly from the edge of the draw bar 10 and the tongue member 24 turned upwardly from the other side, the only difference in this modified form from the above described structure being the method of forming the tongue and side member on the draw bar.

While I have here described and shown my invention in the one best form as now known to me, it is obvious that structural variations may be had without departing from the spirit of the invention, and I, therefore do not desire to be limited to that precise form, nor any more than may be required by the following claims.

I claim:

1. In a coupling device, a latching member having side bars, the rear ends of which are bent upwardly and the forward ends also being bent upwardly, said forward ends being of greater length than the rear ends, a cross bar uniting the rear ends, a tongue extending from the rear cross bar, a tie bar between the side bars near the upward bend of said forward ends, and a cross bar uniting said forward ends, a draw bar, and a tongue carried by the draw bar, said latching member being threaded over said draw bar-tongue and draw bar to have said front and rear cross bars thereabove and said tie bar therebelow, said draw bar having a hole receiving said cross bar tongue therethrough, and said draw bar tongue having a notch across its upper side.

2. In a coupling device, a latching member having side bars, the rear ends of which are bent upwardly and the forward ends also being bent upwardly, said forward ends being of greater length than the rear ends, a cross bar uniting the rear ends, a tongue extending from the rear cross bar, a tie bar between the side bars near the upward bend of said forward ends, and a cross bar uniting said forward ends, a draw bar, and a tongue carried by the draw bar, said latching member being threaded over said draw bar tongue and draw bar to have said front and rear cross bars thereabove and said tie bar therebelow, said draw bar having a hole receiving said cross bar tongue therethrough, and said draw bar tongue having a notch across its upper side, said draw bar tongue also having a second notch in which said front cross bar may rest.

3. In a coupler, two counterpart members each having a side member, a tongue spaced laterally from and extending longitudinally beyond the side member, each tongue and side member having opposing notches across their upper sides, and each tongue having a second notch across its upper side spaced outwardly from its other notch beyond the opposing side member, and a latch member having a cross link adapted to fall across and rest in the opposing notches in the tongue and side member whereby the extending end of one tongue may enter between the other tongue and its opposing side member and have the cross link across the notches thereof also pass through the second notch of the one tongue said latch member having side bars extending from the ends of the cross link to below the tongue and end members and a cross bar joining the side bars below the tongue and side member.

4. In a coupler, two counterpart members each having a side member, a tongue spaced laterally from and extending longitudinally beyond the side member, each tongue and side member having opposing notches across their upper sides, and each tongue having a second notch across its upper side spaced outwardly from its other notch beyond the opposing side member, and a latch member having a cross link adapted to fall across and rest in the opposing notches in the tongue and side member whereby the extending end of one tongue may enter between the other tongue and its opposing side member and have the cross link across the notches thereof also pass through the second notch of the one tongue, and a floor between each tongue and its opposite side member to prevent the tongue entered thereover from dropping away from the cross link passing thereover.

5. In a coupler, two counterpart members each having a side member, a tongue spaced laterally from and extending longitudinally beyond the side member, each tongue and side member having opposing notches across their upper sides, and each tongue having a second notch across its upper side spaced outwardly from its other notch beyond the opposing side member, and a latch member having a cross link adapted to fall across and rest in the opposing notches in the tongue and side member whereby the extending end of one tongue may enter between the other tongue and its opposing side member and have the cross link across the notches thereof also pass through the second notch of the one tongue, and a floor between each tongue and its opposite side member to prevent the tongue entered thereover from dropping away from the cross link passing thereover, said latch member having side bars extending downwardly from the ends of the cross link to below the tongue and side member and a cross bar joining the side bars under said tongue and side member.

In testimony whereof, I affix my signature.

MARTIN A. ANDERSEN.